United States Patent
Wendt et al.

(10) Patent No.: US 10,609,290 B2
(45) Date of Patent: Mar. 31, 2020

(54) VIDEO COMMUNICATION NETWORK WITH AUGMENTED REALITY EYEWEAR

(71) Applicants: Dallen Wendt, Nicholasville, KY (US); Luke Pennington, Bowling Green, KY (US)

(72) Inventors: Dallen Wendt, Nicholasville, KY (US); Luke Pennington, Bowling Green, KY (US)

(*) Notice: Subject to any disclaimer, the term of this patent is extended or adjusted under 35 U.S.C. 154(b) by 0 days.

(21) Appl. No.: 15/679,220

(22) Filed: Aug. 17, 2017

(65) Prior Publication Data

US 2019/0320123 A1    Oct. 17, 2019

Related U.S. Application Data

(60) Provisional application No. 62/455,347, filed on Feb. 6, 2017, provisional application No. 62/487,627, filed on Apr. 20, 2017.

(51) Int. Cl.
*H04N 5/232* (2006.01)
*G02B 27/01* (2006.01)
*G06T 7/80* (2017.01)

(52) U.S. Cl.
CPC ..... *H04N 5/232935* (2018.08); *G02B 27/017* (2013.01); *G06T 7/80* (2017.01); *H04N 5/23203* (2013.01)

(58) Field of Classification Search
CPC .......... H04N 5/232935; H04N 5/23203; G06T 7/80; G02B 27/017; G02B 2027/0178
See application file for complete search history.

(56) References Cited

U.S. PATENT DOCUMENTS

| | | | | |
|---|---|---|---|---|
| 9,319,980 B1* | 4/2016 | Lewkow | ............... | H04W 52/02 |
| 2015/0138064 A1* | 5/2015 | Li | ........................ | G02B 27/017 345/156 |
| 2017/0332009 A1* | 11/2017 | Zhang | ..................... | G06F 3/011 |
| 2018/0288333 A1* | 10/2018 | VanBlon | ............ | H04N 5/23293 |

* cited by examiner

*Primary Examiner* — Stella L. Woo
(74) *Attorney, Agent, or Firm* — Francis Law Firm PLLC; James M. Francis; Olen York

(57) ABSTRACT

Control of video camera monitors using a augmented reality wearable device is disclosed including integration within a communications network. A user of the wearable device can communicate wirelessly with other components or elements of the network, allowing for hands-free control of the video recording and/or streaming and physical work contemporaneously.

20 Claims, 2 Drawing Sheets

VIDEO COMMUNICATION NETWORK WITH AUGMENTED REALITY EYEWEAR

RELATED APPLICATIONS

This application claims the benefit of U.S. Provisional Patent Application 62/455,347 filed on Feb. 6, 2017 and U.S. Provisional Patent Application 62/487,627 filed on Apr. 20, 2017.

TECHNICAL FIELD

This application relates to augmented reality eyewear configured for wireless communication with and control of the functions of a film/video monitor to modify and change the appearance of the video being recorded.

BACKGROUND

Video content may be used for a variety of reasons, including education, entertainment, marketing of films or products, or other related purposes. With the advances in camera and video recording technology in combination with smart devices, videography and content creation has never been more accessible. Yet, developing video content includes a number of challenges, including general organization of workflow to improve efficiency and reduce time, effort, and costs associated with video content generation. The increasing ubiquity of digital camera and videography equipment causes other challenges, including the management of recording, streaming, editing, and deployment of such video content, especially in real or virtually-real time.

Of the several challenges that video content creators face, three prominent challenges persist. First, the management of recording, streaming, editing, and deployment of video content often involves the use of bulky, hand-controlled components or elements, including the video recording devices or apparatuses presently available. Second, but no less challenging, the management of video content discourages multi-user collaboration because of the limited accessibility of the captured video. Third, the visual adjustments needed during filming can consume significant amounts of time, require a substantial amount of equipment, and require additional manpower. Accordingly, a need persists for addressing the bulky, hand-controlled nature of the video capturing technology and providing a virtually real-time collaborative environment.

This application presents claims and embodiments that fulfill a need or needs not yet satisfied by existing products. The applicant is unaware of any product, device, method, disclosure or reference that discloses the features of the claims and embodiments disclosed herein, and as more fully described below.

SUMMARY

One solution proposed to address the problems in the art comprises a recording and broadcasting communication network having an augmented reality wearable device, a recording apparatus having a monitor, a transmitter, and means for wireless communication between the wearable device, the recording apparatus and monitor, and the transmitter. The network may incorporate a variety of components, including a variety of wearable devices providing views of a single monitor/camera view or a plurality of monitors/camera views. Most importantly, the envisioned embodiments include the use of eyewear, such as frames with image projection capabilities onto at least one lens. Accordingly, the following summary of the individual components are capable of incorporation into the communications network. The monitor is envisioned to be in wireless or wired communication with the camera.

For example, an augmented reality wearable device comprises at least one digital processing unit and a wireless antenna, the at least one digital processing unit having executable code for selecting, communicating, and executing applications controlling a remote monitor for a video recorder; a remote audio/video playback device; a remote camera associated with an image generated from the playback device, the image received by the device; and a plurality of selectable functional options, the plurality of selectable functional options provided via a user interface and the user interface including at least controls for applying visual corrections to the received image, e.g. color corrections using a LUT (lookup table), false color, zebra, spot meter, histogram, audio controls, focus assist, aspect ratio, HDR, and director's viewfinder.

In another embodiment, augmented reality eyewear comprises a frame supporting: at least one digital processing unit, the at least one digital processing unit having executable code for selecting, communicating, and executing applications controlling a remote monitor for a video recorder. The frame also includes an audio/video playback device and a wireless antenna. The frame is associated with an image generated from the playback device, the image projected by the frame, and, a plurality of selectable functional options, the plurality of selectable functional options provided via a user interface, the user interface including at least one of audio controls and visual controls. In such an embodiment, the eyewear may have one lens in a position associated with a single eye, one lens traversing the position of both eyes, or two lenses, one lens for each eye position.

BRIEF DESCRIPTION OF THE DRAWING(S)

The advantages and features of the present invention will become better understood with reference to the following more detailed description and claims taken in conjunction with the accompanying drawings, in which like elements are identified with like symbols, and in which:

DETAILED DESCRIPTION OF THE EMBODIMENT(S)

It will be readily understood that the components of the present invention, as generally described and illustrated in the figures herein, may be arranged and designed in a wide variety of different configurations. Thus, the following detailed description of the embodiments of the system/components and augmented reality eyewear, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
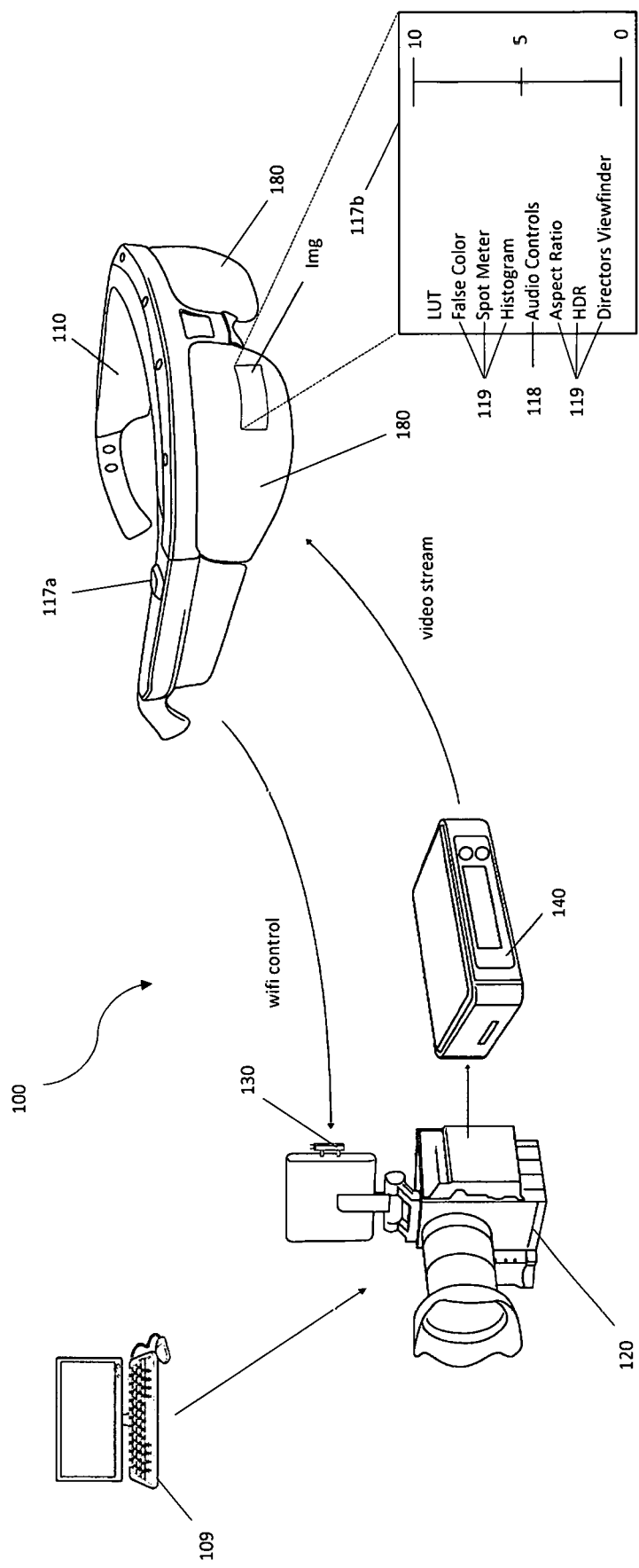
FIG. 1 is a schematic of a video recording and broadcasting network, the network including an augmented-reality wearable device, generally depicted as eyewear having two lenses.

Referring now and in accordance with FIG. 1, a recording and broadcasting communication network 100 for controlling a video recording device 120 is depicted, the networks 100 comprising augmented reality eyewear 110, a monitor 130 for a video recorder 130, and a video transmitter 140.

In an embodiment of the system architecture, the augmented reality eyewear 110 is configured to wirelessly receive video data from a video transmitter 140, e.g. a Teradek Cube, which receives 1080p video streamed from the monitor 130. It is anticipated that the monitor 130 may also incorporate an integrated video transmitter 140 instead of utilizing a separate component like a Teradek Cube. The eyewear 110 provides a 50 degree field of vision, which gives the wearer the equivalent view as if they were viewing a 50 inch screen from 5 feet away. The lenses 180 of the eyewear 110 are transparent so as to not interfere with the vision of the wearer. The monitor 130 is configured to receive wireless commands from the augmented reality eyewear 110 via a wireless communications module 125 that is either original equipment built into the monitor 130 or is an add-on. Alternatively, the camera 120 may also be in wireless communication with and receive commands from the augmented reality eyewear 110.

Figure 2B:
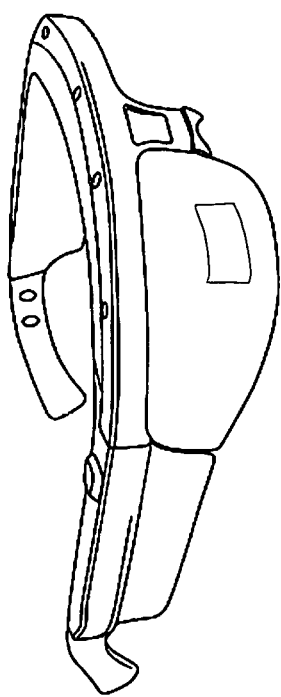
FIG. 2B is a perspective view of one embodiment of eyewear having two lenses, one for each eye.
Figure 2C:
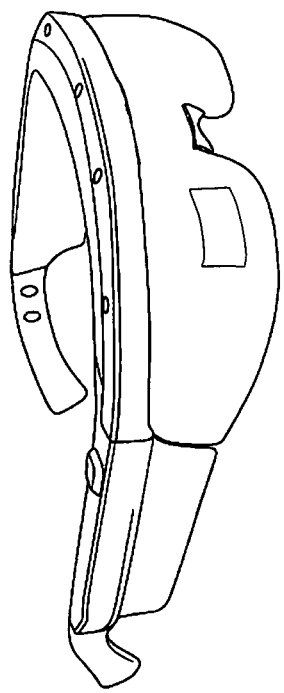
FIG. 2C is a perspective view of one embodiment of eyewear having a single lens traversing both eye positions.
Figure 2A:
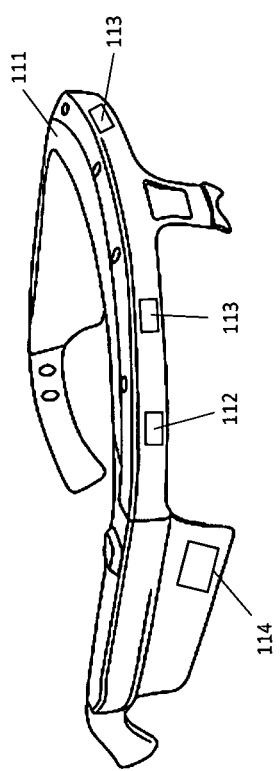
FIG. 2A is a perspective view of one embodiment of eyewear having one lens covering one eye.

In one embodiment, the augmented reality eyewear 110 possesses a single lens covering one eye of the user in accordance with FIG. 2A. The frame 111 projects the image (Img) onto the lens 180 for observation by the wearer of the augmented reality eyewear 110. In another embodiment, wherein the augmented reality eyewear 110 includes two lenses 180 aligned over each eye of a user in accordance with FIG. 2B, the frame 111 may project the image (Img) onto a single lens 180 for observation or both lenses 180. In another embodiment, as depicted in FIG. 2C, wherein the augmented reality eyewear 110 include a single lens 180 traversing both the right and left eye of a user, respectively, and in accordance with FIG. 1, the frame 111 projects the image (Img) onto the lens 180 provided.

In one embodiment, and consistent with the illustrations FIGS. 2A-2C, as a representation of the components of the augmented reality eyewear 110 comprise a frame 111 supporting at least one digital processing unit 112 that has or possesses executable code for selecting, communicating, and executing applicable applications and/or commands for controlling a monitor 130 for a video recording device 120, i.e. camera. The monitor 130 may be either in wired or wireless communication with the camera 120. The control of key functions of the monitor 130 through the frame 111 is accomplished by the user's remote interaction with a monitor control 150. The monitor control 150 can be a frame mounted physical control 115, e.g. a micro-trackball or touchpad, which controls a cursor on a heads-up display projected onto the lenses 180, or alternatively the monitor control system may be voice controlled through the eyewear 110.

The frame 111 also includes an audio/video playback device 113 for generating the appropriate image(s) recorded or streamed via the monitor 130. The frame 111 also includes a wireless antenna and transceiver component 114 for facilitating wireless communication between the augmented reality eyewear 110 and the monitor 130 and the transmitter 140. The frame 111 may then generate an image (Img) on the lens(es) 180 generated from the playback device 113, wherein the image (Img) may be projected by the frame 111 or otherwise generated. The image (Imgs) sent to the lenses 180 from the monitor 130 is also available via additional pairs of linked eyewear 110 for viewing by the crew. In a further embodiment, the images (Imgs) displayed on the lenses 180 of the wearer's interaction with the received images (Imgs) are also available for viewing by the crew the additional pairs of linked eyewear 110. The eyewear 110 also feature wireless audio transceivers 140 in the frame 111 to facilitate user communication between a plurality of pairs of the eyewear 110. A monitor control system enables the remote uploading of the images (Imgs) from the monitor 130 and downloading of commands to the monitor 130 via remotely operated computing devices 109 or eyewear 110 over a wireless network or the internet.

In a further embodiment, the eyewear 110 is also programmed to switch video inputs 160 to receive streaming video from one of a plurality of remote monitors 130. The eyewear 110 also allow the selection of at least one camera 120 to provide images (Imgs) for broadcast.

The frame 111 may include a plurality of selectable functional options 116. In one embodiment, the options 116 may a single or separately depressible buttons or controls 117a on the frame 111 that the user controls via hand or finger manipulation. In another embodiment, the options 116 may be combination of separately depressible buttons or controls 117a on the frame 111 and on-screen controls or cues 117b projected near or adjacent the image (Img) and selectable through voice, eye, and/or hand/finger control or manipulation. In another embodiment, the options 116 may be only on-screen controls or cues 117b. The plurality of selectable functional options 116 may include icons representing audio controls 118 and visual controls 119 provided via a user interface 150. In one envisioned embodiment, the wearable device 110 comprises an augmented or virtual reality enabled smart device, such as a tablet, screen, pad, phone, or other similar device.

It is envisioned that a variety of commercially available augmented reality eyewear may be suitably utilized and integrated into the communications network 100 described herein. For example, augmented reality eyewear commercially provided by Oculus, Google, ODG, or other similar suppliers may be successfully modified and integrated herewith. Provided the augmented reality eyewear 110 is capable of hardware and/or software modification, allowing for the installation of executable code that allows for the selection and communication of a variety of commands, such eyewear 110 is envisioned as suitably adaptable for such use.

A wide variety of useful monitor controls 150 for image and audio manipulation are intended to be available via the augmented reality eyewear 110. The hands-free nature of the eyewear 110 also creates a more effective director's viewfinder and allows both the director, cinematographer, and others to not only observe the field of view but also the character of the image in terms of depth of field, optical aberration and general subjective aesthetics. Additionally, the eyewear 110 permits the wearer to capture an image (Img) for use in storyboarding.

It is envisioned that the monitor's audio tools 118, i.e. audio controls, are controllable available via the eyewear 110 and may include adjustable amplitude selection levels, adjustable channel routing selection, adjustable limiting and/or attenuating selection levels, adjustable recording formats, and/or adjustable monitoring feature(s) selection. It is similarly envisioned that the image tools 119, image controls, may include adjustable color selection options, exposure controls, adjustable intensity selection levels, and/or adjustable focus selection levels. Grips, gaffers, the director of photography, and the director are among those who would benefit from immediate feedback from viewing the monitor 130 through the eyewear 110. This also permits significant time savings during staging and timing around desired lighting and weather conditions. Remote access to, and control of, audio provides significant time savings.

Another useful control is the remote application of lookup table (LUT) modifications for one-dimensional (1D) and/or three-dimensional (3D) images. As used herein, the LUT modifications are algorithms used as a modifier between two images, an original source image that is a raw or flat file that is being recorded and a display image that may be evaluated or examined during the production process to assist in the creative decision-making process (e.g., for determining exposure levels). The LUT may be stored as metadata or as part of the metadata within the monitor 130 of the video recording device.

Moreover, the remote application of image evaluation and adjustment tools, e.g. exposure metering and compensation technology, reduces manpower, time, and cost of the production. All such features may be represented by designated icons in the user interface 150 of the eyewear 110.

More particularly for the visual controls or operations 119, the most common exposure meters utilized include histogram, waveform, zebra, and false color, and therefore are included as part of the functionality (and operational instructions 116) that a user may adjust using the eyewear 110. For example, image evaluation and adjustment options may include a meter for false color wherein the exposure metering technology may generate specific IRE values by area using precise gauging of reflected exposure levels that reach the camera sensor. The values are represented by dedicated color values displayed within the monitor 130 that may then be transmitted and displayed via the eyewear 110.

False color and zebra tools are useful for assessing tonal levels within different regions of an image. This reveals exactly where there are potential problems, and can make it easier to adjust the lighting or camera settings accordingly.

False color refers to a group of color rendering methods used to display images in color which were recorded in the visible or non-visible parts of the electromagnetic spectrum. A false-color image is an image that depicts an object in colors that differ from those a photograph would show.

In false color, the resulting wavelengths correspond to shades of five colors: blue, purple, red, green-white and yellow. When transformed into false color, the resulting colors of the image represent brightness and act as indicators of relative overexposure and underexposure. In its application, lower IRE values (typically indicated by pink and blue under false color) means that those areas will be underexposed, and important details may be left out from the picture. Similarly, any details represented by higher IRE values (typically appearing as red and orange while in false color) would appear overexposed. Digital cameras 120 record images as a series of numbers, just like all digital devices do. IRE numbers represent the brightness of each pixel of a recorded image. That brightness may be thought of as an IRE of 0 when it's totally dark or black, and 100 when it's as bright as it can possibly be. False color is useful when assessing tonal levels within areas of an image, allowing a user to adjust the lighting in the environment to achieve a more balanced picture.

Zebras are black and white striped patterns that are superimposed onto the picture at the monitor 130 on any area of the image that's within a set band of exposure to indicate exposure levels. The 100% zebra pattern indicates that the recorded pixels are at their maximum value and that an area of an image is overexposed. Zebras are typically used to optimize the exposure for faces, especially when filming lighter skin because of the increased reflectivity.

Spot metering is yet another exposure metering technology that may be selected by the user via the eyewear 110. Spot metering measures the intensity of light received from specific areas within the scene (being metered) within a cone of small angle, usually 5 cm or less. Spot metering measures reflectance of light rather than incidence and adjusts the exposure of the image to optimize the exposure of the area of the image being metered.

The user may also select utilize a histogram via the eyewear 110 for the purpose of evaluating and adjusting exposure. A histogram is a graphical representation of the tonal values of an image and is utilized as an exposure metering method consisting of rectangles whose area is proportional to the intensity of light and whose width is equal to the dynamic range of the camera's 120 sensor. The dynamic range is the range from the darkest part of the image and the brightest part of the image that is capable of holding detail without clipping/whites or crushing/blacks. A histogram shows the amount of tones of particular brightness found in an image ranging from black (0% brightness) to white (100% brightness). Dark tones are displayed on the left side of a histogram. As you move rightward, tones get lighter. The middle portion of a histogram represents midtones, which are neither dark nor light. The vertical axis of a histogram displays the amount of tones of that particular lightness.

Usually, a better histogram would render most tones in the middle portion of the graph, and no or few tones would be found at the extreme edges. A problematic histogram could have tones at the very edges of the graph, which would basically mean either underexposure to the point of lost shadow detail (shadow clipping), or overexposure to the point of lost highlight detail (highlight clipping), or even both in a single image.

Another function to be remotely controlled via the eyewear 110 is the aspect ratio. Aspect ratio describes the proportional relationship between the width of the image and its height. Monitor controls will often overlay various different aspect ratios (one at a time, chosen by user) in order to assist in image composition. The user controls the opacity of the overlay, which can be 'baked into' the captured source image, or merely displayed on the monitor 130, for evaluative purposes only, leaving the source image clear of production aspect ratio alterations (receiving the full image reaching the camera's sensor via the lens). Perception of the boundaries of various aspect ratios and the control of those aspect ratios facilitates scene composition when recording.

HDR, i.e. high dynamic range, controls may also be selected via the eyewear and assist in the evaluation of images being recorded in raw or flat profiles which allows the user a closer rendition of the image by giving a preview of the added dynamic range. HDR produces a photo with an unusually high dynamic range that couldn't otherwise be achieved in a single photograph, which can achieve a more accurate reproduction of what the human eye sees varying shutter speed/aperture combinations in order to produce a set of images with varying luminosity and depth of field.

In photography, HDR takes a plurality of photographs at once (e.g. underexposed, properly exposed, and overexposed) and these images are then layered together allowing for an image that holds a greater degree of blacks and whites than any of the single images could have rendered. In cinematography, a raw, flat profile image captures the widest possible dynamic range in a single image in a similar fashion as described above and ultimately providing HDR post-production image manipulation ability. The downside to HDR is that the image lacks tonal contrast which affects not only exposure evaluation in production, but also color value (hue, saturation, brightness) and critical focus evaluation.

HDR monitoring/controls allow the user to adjust the dynamic range on the monitor 130 (often set up by camera profile log-curves) in order to better represent the image being captured for image evaluation purposes on set without altering the raw source file being captured.

The system 10 may also act as a director's view finder through the augmented reality glasses camera 120, or any compatible device with a camera 120. The director's viewfinder accurately defines choice of lenses, angles and coverage in a variety of aspect ratios. A wearer of the eyewear 110 can communicate with others on set or anywhere in the world via cloud based computing, allowing collaboration, and the ability to view what another is viewing. This function will allow the wearer to frame shots accurately, as well as communicate directorial vision instantly to compatible devices.

The viewfinder function replaces hardware viewfinders that can only be viewed by one person at a time and will perform the following functions, readily viewed by any collaborator via connected compatible device: digitally zoom (12:1 zoom ratio), programmable with exact field of view specifications of individual lenses from manufacturers (as well as focal distance, depth of field readings, and hyperfocal readings indicated on screen numerically/by color code or image radius/radial shifting or 'blurring' of the image at specific distances to emulate lens character). Manufacturer lens specifications can be uploaded/removed from the glasses as needed by the wearer. The wearer can change focal length (field of view and image distortion/aberration patterns) of the proposed lens via software uploaded to the glasses as well as access depth of field lens character simulation for evaluation of composition by the wearer and collaborators with compatible devices and via cloud based computing.

Through the eyewear 110, or other remote screen device, a plurality of remote users may view streaming video, make changes, and save those changes to the monitor 130 for use in post-production. Additionally, through augmented reality glasses 110, the system 10 provides the ability to communicate wirelessly to other members of the team via audio and shared images via the cloud.

In separate but related embodiments, the selectable options 116 may be projected near or immediately adjacent the image (Img) projected by frame 111. Thus, the selectable options 116 may be selected by the use of hands-free techniques, including audible command(s) and/or eye movement(s).

The camera 120 with monitor 130 may comprise a variety of embodiments and configurations. For example, a multitude of camcorder devices 120, camera 120 and recording components interconnected, and other video recording devices may be utilized. It is envisioned that the monitor 130 comprises a 7-inch screen for viewing the video content.

It is envisioned that the wireless module 125 may comprise a variety of embodiments and configurations. For example, in one embodiment, the wireless module 125 may be integral to the monitor 130. In another embodiment, such as that depicted in FIG. 1, the wireless module 125 may be a separate component that may be manually coupled to the monitor 130. Other embodiments and configurations are envisioned as well. Regardless of configuration, the wireless module 125 facilitates wireless communication between the monitor 130 and eyewear 110. The wireless communication between wireless module 125 and monitor 130 enables user control of the functional operations 116 (such as audio controls or operations 118 and/or visual controls or operations 119) that may be selected via the augmented reality eyewear 110.

One example of the wireless module 125 that may be utilized includes the integration of a simple, single-board computer, such as a Raspberry Pi, which interconnects the video control interface and the operational commands, i.e. camera, audio, and image evaluation and adjustment tools of the monitor available to and selected from the eyewear 110. The interconnection is preferably achieved through wireless communication.

Alternatively, the network 100 may include a color correction device, such a Teradek's device sold under the name of COLR, may be integrated to convert the raw video data into a H.264 stream. This video stream is transmitted to a wearable device 110, such as augmented reality eyewear 110. The monitor and/or camera respond to camera, audio, and image evaluation and adjustment tools commands transmitted from the augmented reality eyewear 110. A previously created image adjustment profile can be retrieved by the eyewear 110 and applied for the user's purposes, e.g. comparison and matching. Profile retrieval may be especially useful for scenes lasting hours or days to facilitate color correction and matching to previously filmed parts of the scene so as to minimize discrepancies.

Alternatives to wireless communication for the remote application of camera, audio, and image evaluation and adjustment tools are also envisioned. For example, communication via a serial digital interface (SDI) via coaxial cabling or high-definition multimedia interface (HDMI) via cabling are envisioned. Each component (e.g., 120, 130, and/or 140) may include connector ports for accepting and retaining SDI and/or HDMI cables for hardwired connection and transmission of the appropriate signals. Other serial communication protocols that are envisioned for integration include RSG32 protocol.

The video transmitter 140 may be a monitor integrated wireless video transmitter component or could also be a multi-component video transmitter (e.g., video transmitter+ wireless module) in communication with the monitor. One example of a modular video transmitter 140 that may be integrated and utilized as part of the communications network 100 described above is a wireless video transmitter used for recording, point-to-point broadcasting, and/or streaming sold by Teradek under the trademark CUBE. Another commercial example is an encoder with ASI and IP output sold by Markertek under the trademark THOR. Other similar single or multi-component transmitters are envisioned as suitable for use herewith.

In operation, the image evaluation and adjustment tools are applied to the raw video stream and encoded to H.264 format and streamed wirelessly to a wearable device 110, such as an augmented reality eyewear device or a virtual reality eyewear device. In this configuration, it is envisioned that the communications network 100 allows a user to switch between image evaluation and adjustment tool selections and instantly view the differences or distinctions between the selections via the augmented reality eyewear 110, whether exteriorly projected or reflected on a lens or lenses 180 of the augmented reality eyewear 110.

At least one intended and desirable use of the described embodiments includes a user of the eyewear communicating with other individuals and/or components within the network 100, with the individuals or components either on set or anywhere in the world, utilizing cloud-based computing, facilitating collaboration, and the ability to view what another and/or others is/are viewing. Users can collaborate in real time utilizing a camera's view 120, thereby allowing selection of a number of command and control functions (as previously indicated above) to make decisions and modifications on the camera or monitor 130. Thus, the network 100 facilitates remote control as if one was standing in front of the monitor 130 or camera 120, using augmented reality eyewear 110 or other devices. Additionally, the network technology could be programmed to view multiple camera views at one time, and switch between views either during set-up of an event or control at a live event. Also, the network technology may lead to the production of wireless monitors 130 and cameras 120 or monitors 130 that stream video without the need of external streaming devices.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A video production system comprising:
    a. a video production monitor;
    b. a video camera;
    c. a wireless transceiver in communication with at least one of said video production monitor and said video camera for transmitting at least one of video data and audio data from said video production monitor and receiving wirelessly transmitted operational instructions to relay to at least one of said video production monitor and said video camera;
    d. eyewear having a frame, at least one lens, and a wireless eyewear transceiver in communication with at least one of said video production monitor and said video camera for receiving video and audio data from at least one of said video production monitor and said video camera and sending said operational instructions from a user of said eyewear to at least one of said video production monitor and said video camera, and at least one digital processing unit and memory, the at least one digital processing unit having executable code for selecting, executing and communicating said operational instructions to at least one of said video production monitor and said video camera, said operational commands including image evaluation and adjustment tools;
    e. an audio/video projection device integrated with said eyewear to project video received by said wireless eyewear transceiver onto said at least one lens and to provide the wearer with received audio; and
    f. a set of user controls integrated with said eyewear to issue said operational instructions to at least one of said video production monitor and video camera from said eyewear, said operational instructions including a plurality of selectable functional options to evaluate and modify at least one of an image and audio.

2. The video production system of claim 1, wherein said audio/video projection device projects a menu of options and instructions onto said at least one lens.

3. The video production system of claim 2, wherein said eyewear possesses controls for the user to navigate through said menu and to select menu options.

4. The video production system of claim 3, wherein said controls for the user to navigate through said menu and to select menu options are hands-free controls.

5. The video production system of claim 3, wherein said controls for the user to navigate through said menu and to select menu options are physical controls.

6. The video production system of claim 5, wherein said physical controls include at least one button.

7. The video production system of claim 6, wherein said physical controls include a cursor control for the manipulation of a cursor projected onto said at least one lens.

8. The video production system of claim 7, wherein said operational instructions are selected from the group consisting of image exposure controls, LUT selection, profile storage, profile selection, and audio controls.

9. The video production system of claim 7, wherein said operational instructions are selected from the group consisting of video camera selection, video camera operation, and video production monitor operation.

10. A method of remotely executing image adjustment commands to a video production monitor, the method comprising: wirelessly transmitting images from a video production monitor; wirelessly receiving said images with a receiver integrated into eyewear having at least one lens, a control system, and an audio/video projection device arranged to project images onto said at least one lens; projecting said images onto said at least one lens; projecting a user selectable menu of image adjustment commands onto said at least one lens; having the user select at least one image adjustment command to apply to said image; and applying said image adjustment command to said image.

11. The method of claim 10, wherein said image adjustment commands are selected from the group consisting of image exposure controls, LUT selection, profile storage, profile selection, and audio controls.

12. A video production system comprising:
a. a video production monitor;
b. a wireless transceiver in communication with said video production monitor for transmitting at least one of video data and audio data from said video production monitor and receiving wirelessly transmitted operational instructions to relay to said video production monitor;
c. eyewear having a frame, at least one lens, and a wireless eyewear transceiver in communication with said video production monitor, said eyewear being configured to receive at least one of video data and audio data from said video production monitor and sending said operational instructions said eyewear to said video production monitor, and at least one digital processing unit and memory, the at least one digital processing unit having executable code for selecting, executing and communicating said operational instructions to said video production monitor, said operational commands including image evaluation and adjustment tools;
d. an audio/video projection device integrated with said eyewear to project video received by said wireless eyewear transceiver onto said at least one lens and to provide the wearer with received audio; and
e. a set of user controls integrated with said eyewear to issue said operational instructions said video production monitor from said eyewear, said operational instructions including a plurality of selectable functional options to evaluate and modify at least one of an image and audio.

13. The video production system of claim 12, wherein said audio/video projection device projects a menu of options and instructions onto said at least one lens.

14. The video production system of claim 13, wherein said eyewear possesses controls for the user to navigate through said menu and to select menu options.

15. The video production system of claim 14, wherein said controls for the user to navigate through said menu and to select menu options are hands-free controls.

16. The video production system of claim 14, wherein said controls for the user to navigate through said menu and to select menu options are physical controls.

17. The video production system of claim 16, wherein said physical controls include at least one button.

18. The video production system of claim 17, wherein said physical controls include a cursor control for the manipulation of a cursor projected onto said at least one lens.

19. The video production system of claim 18, wherein said operational instructions are selected from the group consisting of image exposure controls, LUT selection, profile storage, profile selection, and audio controls.

20. The video production system of claim 18, wherein said operational instructions are selected from the group consisting of video camera selection, video camera operation, and video production monitor operation.

* * * * *